United States Patent Office.

CARLETON B. HUTCHINS, OF ANN ARBOR, MICHIGAN.

Letters Patent No. 110,852, dated January 10, 1871.

IMPROVEMENT IN ARTIFICIAL STONE FOR PAVEMENTS, WALKS, FLOORS, &c.

The Schedule referred to in these Letters Patent and making part of the same.

I, CARLETON B. HUTCHINS, of Ann Arbor, county of Washtenaw and State of Michigan, have invented a new and improved Composition for Artificial Stone, to be used as flooring, paving, walks, tunneling, and other purposes for which it may become adapted.

The nature of my invention consists in the compounding of ingredients with directions hereafter named.

To prepare this composition, I take six hundred pounds of sand or gravel, one hundred and fifty pounds of rosin, five gallons of vegetable tar. A part ground stone of any kind can be added, if wished.

If I wish to make it more compact and water-tight, I add small quantities of dried clay.

If I wish to give the flooring a red color, I add a small quantity of Venetian red.

If I wish to make it white, I dress up the top with whiting or plaster of Paris, partly calcined.

You can increase or diminish any of the before-named ingredients and vary their introduction, as before stated.

I boil these ingredients together very thoroughly, which serves to make the combination very tough and durable, and is nearly inodorous, which gives it great advantages over all mineral tar compounds. It is also perfectly impervious to water.

What I claim as my invention, and desire to secure by Letters Patent, is—

The compound produced by uniting the ingredients as set forth in the foregoing specification.

CARLETON B. HUTCHINS.

Witnesses:
 T. J. MESICK,
 THOS. MULLEN.